(12) United States Patent
Kim et al.

(10) Patent No.: US 11,445,735 B2
(45) Date of Patent: Sep. 20, 2022

(54) TOFU WITH IMPROVED QUALITY AND MANUFACTURING METHOD THEREOF

(71) Applicant: CJ CHEILJEDANG CORPORATION, Seoul (KR)

(72) Inventors: Yeo Jin Kim, Seoul (KR); Hong Wook Park, Seoul (KR); Young Mi Lee, Suwon-si (KR); Byoung Seok Moon, Anyang-si (KR); Seong Bo Kim, Seongnam-si (KR); Seong Jun Cho, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 189 days.

(21) Appl. No.: 16/461,284

(22) PCT Filed: Nov. 23, 2017

(86) PCT No.: PCT/KR2017/013431
§ 371 (c)(1),
(2) Date: May 15, 2019

(87) PCT Pub. No.: WO2018/097623
PCT Pub. Date: May 31, 2018

(65) Prior Publication Data
US 2020/0054036 A1  Feb. 20, 2020

(30) Foreign Application Priority Data

Nov. 24, 2016  (KR) .................. 10-2016-0157292

(51) Int. Cl.
*A23L 11/45* (2021.01)
*A23L 29/30* (2016.01)
(Continued)

(52) U.S. Cl.
CPC ............ *A23C 20/025* (2013.01); *A23L 11/00* (2016.08); *A23L 29/30* (2016.08); *A23V 2002/00* (2013.01)

(58) Field of Classification Search
CPC . A23L 33/105; A23L 2/52; A23L 2/60; A23L 33/185; A23L 5/00; A23L 11/40;
(Continued)

(56) References Cited

U.S. PATENT DOCUMENTS 4,818,558 A * 4/1989 Hartman .............. A23C 20/025
426/634
9,504,703 B2   11/2016 Kim et al.
(Continued)

FOREIGN PATENT DOCUMENTS

CN       101129180 B    6/2011
CN       103960374 A    8/2014
(Continued)

OTHER PUBLICATIONS

Ju-Young Kim et al., "Quality Attributes of Whole Soybean flour Tofu Affected by Coagulant and Theirs Concentration", Korean Journal of Food Science and Technology, 2000, vol. 32, No. 2, pp. 402-409.
(Continued)

*Primary Examiner* — Hong T Yoo
(74) *Attorney, Agent, or Firm* — Renner, Otto, Boisselle & Sklar, LLP

(57) ABSTRACT

The present application relates to tofu comprising soy, allulose and a coagulant. The present application also relates to a method for manufacturing tofu using allulose.

8 Claims, 1 Drawing Sheet

(51) Int. Cl.
*A23C 20/02* (2021.01)
*A23L 11/00* (2021.01)

(58) Field of Classification Search
CPC .......... A23L 11/50; A23L 29/30; A23L 11/00; A23L 11/45; A23C 20/025; A23C 9/156; A23C 19/0925; A23C 20/00; A23C 20/005; A23C 19/02
See application file for complete search history.

(56) References Cited

U.S. PATENT DOCUMENTS

| | | | |
|---|---|---|---|
| 9,839,647 | B2 | 12/2017 | Kim et al. |
| 2010/0204346 | A1* | 8/2010 | Okuma .................. A23L 29/30 514/777 |
| 2014/0329286 | A1 | 11/2014 | Kim et al. |
| 2014/0349950 | A1 | 11/2014 | Kim et al. |
| 2016/0302463 | A1 | 10/2016 | Woodyer et al. |
| 2016/0331014 | A1* | 11/2016 | Perera .................... A23L 33/18 |
| 2016/0346305 | A1 | 12/2016 | Kim et al. |
| 2016/0361331 | A1 | 12/2016 | Kim et al. |

FOREIGN PATENT DOCUMENTS

| | | | |
|---|---|---|---|
| CN | 105828639 | A | 8/2016 |
| JP | H02-190159 | A | 7/1990 |
| JP | 2004-049193 | A | 2/2004 |
| JP | 2012-231780 | A | 11/2012 |
| JP | 2013-031422 | A | 2/2013 |
| JP | 2013-123425 | A | 6/2013 |
| JP | 2013-247872 | A | 12/2013 |
| JP | 2014-526258 | A | 10/2014 |
| JP | 2015500802 | | 1/2015 |
| JP | 2016-068554 | A | 5/2016 |
| KR | 10-2006-0000803 | | 1/2006 |
| KR | 10-2010-0084881 | | 7/2010 |
| KR | 10-2011-0074065 | | 6/2011 |
| KR | 10-2013-0060477 | | 6/2013 |
| KR | 10-2015-0063635 | | 6/2015 |
| KR | 10-2016-0089551 | | 7/2016 |
| KR | 10-2016-0098249 | | 8/2016 |

OTHER PUBLICATIONS

PCT/KR2017/013431; PCT International Search Report of the International Searching Authority dated Feb. 8, 2018 and translation.
"Research advance of tofu manufacture", Food and Oil, Dec. 31, 2007, vol. 9, pp. 7-10 (Translation of Abstract only).
Original and English Translation of Office Action issued for corresponding Chinese National Stage Application No. 201780072560, dated Jun. 24, 2022.

* cited by examiner

TOFU WITH IMPROVED QUALITY AND MANUFACTURING METHOD THEREOF

TECHNICAL FIELD

The present application relates to tofu with improved quality and a manufacturing method thereof.

BACKGROUND ART

Generally, tofu is prepared by grinding beans macerated in water, then heating, separating the same into bean liquid and pureed bean, adding a coagulant to the bean liquid, and coagulating.

Property determining the texture of tofu is hardness, springiness, etc., and several studies have been conducted on a tofu coagulant for achieving the hard and elastic texture of conventional tofu (Korean Patent Laid-open Publication No. 10-2011-0074065). Furthermore, uncurdled bean curd or silken tofu having soft texture is prepared using glucono-δ-lactone (GDL) as a coagulant, but is disadvantageous in exhibiting sour taste.

Allulose is a monosaccharide present in the natural world, such as raisin, fig, wheat, etc. The alluose has attracted much interest as raw materials for food substituting for sugar because the allulose is scarcely metabolized and has almost zero calorie, while being absorbed in the body. However, allulose has not been considered to apply to tofu without sugar.

Under this background, the present inventors have studied to develop tofu with improved soft texture of tofu. As a result, it is confirmed that when tofu is prepared by adding allulose thereto, soft texture is improved due to a decrease in hardness of tofu and generation of bubbles is reduced, thereby preparing tofu having a good appearance preference.

DISCLOSURE OF THE INVENTION

Technical Problem

One objective of the present application provides tofu including beans, allulose, and a coagulant.

Another objective of the present application also provides a method for manufacturing tofu including: adding a coagulant to bean liquid; and adding allulose to the bean liquid before or during adding the coagulant.

Technical Solution

Hereinafter, the present application will be described in detail. Meanwhile, the description and embodiment of one aspect disclosed in the present application may also be applied to the description and embodiments to another aspect with respect to common features. Furthermore, all combinations of various elements disclosed in the present application fall within the scope of the present application. In addition, it does not appear that the scope of the present application is limited by the following detailed aspects and embodiments.

According to an aspect of the present invention, there is provided tofu including beans, allulose, and a coagulant.

In one embodiment, the tofu of the present application may have a hardness of 80 g to 150 g, specifically, 80 g to 140 g, 80 g to 135 g, 80 g to 127 g, 80 g to 123 g, 80 g to 115 g, 80 g to 110 g, 90 g to 150 g, 90 g to 140 g, 90 g to 135 g, 90 g to 127 g, 90 g to 123 g, 90 g to 115 g, 90 g to 110 g, 100 g to 150 g, 100 g to 140 g, 100 g to 135 g, 100 g to 127 g, 100 g to 123 g, 100 g to 115 g, 100 g to 110 g, 110 g to 150 g, 110 g to 140 g, 110 g to 135 g, 110 g to 127 g, 110 g to 123 g, 115 g to 150 g, 115 g to 140 g, 115 g to 135 g, 115 g to 127 g, 115 g to 123 g, 123 g to 150 g, 123 g to 140 g, 123 g to 135 g, 123 g to 127 g, 127 g to 150 g, 127 g to 140 g, or 127 g to 135 g.

In another embodiment, the tofu of the present application may have a springiness of 0.8 to 1.5, specifically, 0.8 to 1.4, 0.8 to 1.3, 0.8 to 1.2, 0.8 to 1.1, 0.8 to 1.05, 0.9 to 1.5, 0.9 to 1.4, 0.9 to 1.3, 0.9 to 1.2, 0.9 to 1.1, 0.9 to 1.05, 1.0 to 1.5, 1.0 to 1.4, 1.0 to 1.3, 1.0 to 1.2, 1.0 to 1.1, 1.0 to 1.05, 1.05 to 1.5, 1.05 to 1.4, 1.05 to 1.3, 1.05 to 1.2, 1.05 to 1.1, 1.1 to 1.5, 1.1 to 1.4, 1.1 to 1.3, 1.1 to 1.2, 1.2 to 1.5, 1.2 to 1.4, or 1.2 to 1.3.

In still another embodiment, the tofu of the present application may have a gumminess of 50 g to 100 g, specifically, 50 g to 95 g, 50 g to 90 g, 50 g to 80 g, 60 g to 100 g, 60 g to 95 g, 60 g to 90 g, 60 g to 80 g, 70 g to 100 g, 70 g to 95 g, 70 g to 90 g, 70 g to 80 g, 80 g to 100 g, 80 g to 95 g, 80 g to 90 g, 85 g to 100 g, 85 g to 95 g, 85 g to 90 g.

In yet another embodiment, the tofu of the present application may have a cohesiveness of 0.6 to 0.75, specifically, 0.6 to 0.72, 0.6 to 0.70, 0.65 to 0.75, 0.65 to 0.72, 0.65 to 0.70, 0.70 to 0.75, 0.70 to 0.72, or 0.72 to 0.75.

In yet still another embodiment, the tofu of the present application may have a chewiness of 50 g to 200 g, specifically, 50 g to 150 g, 50 g to 120 g, 50 g to 100 g, 50 g to 90 g, 60 g to 200 g, 60 g to 150 g, 60 g to 120 g, 60 g to 100 g, 60 g to 90 g, 70 g to 200 g, 70 g to 150 g, 70 g to 120 g, 70 g to 100 g, 70 g to 90 g, 80 g to 200 g, 80 g to 150 g, 80 g to 120 g, 80 g to 100 g, 80 g to 90 g, 90 g to 200 g, 90 g to 150 g, 90 g to 120 g, 90 g to 100 g, 100 g to 200 g, 100 g to 150 g, 100 g to 120 g, or 100 g to 110 g.

In a further embodiment, the allulose of the present application may be contained such that a dry solid content thereof is in a range of 0.1 wt % to 50 wt %, based on the total weight of the tofu. Specifically, the allulose may be contained such that a dry solid content thereof is in a range of 0.1 wt % to 40 wt %, 0.1 wt % to 30 wt %, 0.1 wt % to 20 wt %, 0.1 wt % to 12 wt %, 0.1 wt % to 9 wt %, 0.1 wt % to 5 wt %, 1 wt % to 50 wt %, 1 wt % to 40 wt %, 1 wt % to 30 wt %, 1 wt % to 20 wt %, 1 wt % to 12 wt %, 1 wt % to 9 wt %, 1 wt % to 5 wt %, 2 wt % to 50 wt %, 2 wt % to 40 wt %, 2 wt % to 30 wt %, 2 wt % to 20 wt %, 2 wt % to 12 wt %, 2 wt % to 9 wt %, 2 wt % to 5 wt %, 3 wt % to 50 wt %, 3 wt % to 40 wt %, 3 wt % to 30 wt %, 3 wt % to 20 wt %, 3 wt % to 12 wt %, 3 wt % to 9 wt %, 3 wt % to 5 wt %, 5 wt % to 50 wt %, 5 wt % to 40 wt %, 5 wt % to 30 wt %, 5 wt % to 20 wt %, 5 wt % to 12 wt %, 5 wt % to 9 wt %, 9 wt % to 50 wt %, 9 wt % to 40 wt %, 9 wt % to 30 wt %, 9 wt % to 20 wt %, 9 wt % to 12 wt %, 12 wt % to 50 wt %, 12 wt % to 40 wt %, 12 wt % to 30 wt %, or 12 wt % to 20 wt %, based on the total weight of the tofu.

In another embodiment, the beans of the present application may be included in an amount of 50 wt % to 99.8 wt %, specifically, 50 wt % to 99 wt %, 50 wt % to 97 wt %, 50 wt % to 95 wt %, 50 wt % to 92 wt %, 50 wt % to 87 wt %, 50 wt % to 82 wt %, 60 wt % to 99.8 wt %, 60 wt % to 99 wt %, 60 wt % to 97 wt %, 60 wt % to 95 wt %, 60 wt % to 92 wt %, 60 wt % to 87 wt %, 60 wt % to 82 wt %, 70 wt % to 99.8 wt %, 70 wt % to 99 wt %, 70 wt % to 97 wt %, 70 wt % to 95 wt %, 70 wt % to 92 wt %, 70 wt % to 87 wt % 70 wt % to 82 wt %, 75 wt % to 99.8 wt %, 75 wt % to 99 wt %, 75 wt % to 97 wt %, 75 wt % to 95 wt %, 75 wt % to 87 wt %, 75 wt % to 82 wt %, 82 wt % to 99.8 wt %, 82 wt % to 97 wt %, 82 wt % to 95 wt %, 82 wt % to 92 wt %, 82 wt % to 87 wt %, 87 wt % to 99.8 wt %, 87 wt % to 99 wt %, 87 wt % to 97 wt %, 87 wt % to 95 wt %, 87 wt % to 92 wt %, 92 wt % to 99.8 wt %, 92 wt % to 99 wt %, 92 wt % to 97 wt %, or 92 wt % to 95 wt %, based on the total weight of the tofu.

In still another embodiment, the coagulant of the present application may be included in an amount of 0.1 wt % to 1.0 wt %, specifically 0.1 wt % to 0.7 wt %, 0.1 wt % to 0.5 wt %, 0.1 wt % to 0.4 wt %, 0.1 wt % to 0.3 wt %, 0.2 wt % to 1.0 wt %, 0.2 wt % to 0.7 wt %, 0.2 wt % to 0.5 wt %, 0.2 wt % to 0.4 wt %, or 0.2 wt % to 0.3 wt %, based on the total weight of the tofu.

In yet another embodiment, the allulose of the present application may be contained such that a dry solid content thereof is in a range of 0.1 to 40 parts by weight, specifically, 0.1 to 30 parts by weight, 0.1 to 20 parts by weight, 0.1 to 15 parts by weight, 0.1 to 10 parts by weight, 0.1 to 5 parts by weight, 1 to 40 parts by weight, 1 to 30 parts by weight, 1 to 20 parts by weight, 1 to 15 parts by weight, 1 to 10 parts by weight, 1 to 5 parts by weight, 5 to 40 parts by weight, 5 to 30 parts by weight, 5 to 20 parts by weight, 5 to 15 parts by weight, 5 to 10 parts by weight, 10 to 40 parts by weight, 10 to 30 parts by weight, 10 to 20 parts by weight, 10 to 15 parts by weight, 15 to 40 parts by weight, 15 to 30 parts by weight, or 15 to 20 parts by weight, based on 100 parts by weight of the bean.

In yet still another embodiment, the tofu of the present application may have a dry solid content in a range of 5 wt % to 50 wt %, specifically, 5 wt % to 25 wt %, 5 wt % to 19 wt %, 5 wt % to 16.5 wt %, 5 wt % to 14 wt %, 5 wt % to 11.5 wt %, 11.5 wt % to 50 wt %, 11.5 wt % to 25 wt %, 11.5 wt % to 19 wt %, 11.5 wt % to 16.5 wt %, 11.5 wt % to 14 wt %, 14 wt % to 50 wt %, 14 wt % to 25 wt %, 14 wt % to 19 wt %, 14 wt % to 16.5 wt %, 16.5 wt % to 50 wt %, 16.5 wt % to 25 wt %, 16.5 wt % to 19 wt %, 19 wt % to 50 wt %, or 19 wt % to 25 wt %.

In one embodiment, a bean of the present application may be at least one selected from the group consisting of a soybean, a pea, a kidney bean, Rhynchosia Nulubilis, a green soybean, a brown soybean, a yellow soybean, a choice bean, a horse bean, a black bean, and a green bean, specifically a yellow soybean. Further, the term "bean", as used herein, refers to a meaning encompassing bean itself, a ground bean, a heated bean, a ground and heated bean, and bean liquid in which pureed bean is separated from beans.

In addition, the allulose of the present application refers to C3-isomer (epimer) of fructose, a kind of ketohexose in a monosaccharide (C6). The allulose of the present application may be, but is not limited to, one extracted directly from natural object, and one prepared by chemical synthesis or biosynthesis using an enzyme. Moreover, the allulose may be a crystalline form or a liquid form (i.e., syrup). Liquid allulose may contain an allulose of 10 wt % to 99 wt % based on dry solids (ds or DS). Crystal allulose may also contain an allulose of 90 wt % to 100 wt % based on dry solids.

Furthermore, the coagulant of the present application may be at least one selected from the group consisting of magnesium chloride, calcium sulfate, calcium lactate, calcium chloride, sodium chloride, glucono delta lactone, bay salt, seawater, and bittern. Specifically, the coagulant of the present application may be magnesium chloride.

The tofu of the present application may further include food ingredients (e.g., vitamin, electrolyte, flavoring agents, coloring agents, pectic acids and salts thereof, organic acids, pH adjusting agents, stabilizers, preservatives, glycerin, carbonator, etc.).

According to another aspect of the present application, the present application provides a method for manufacturing tofu comprising: adding a coagulant to bean liquid; and adding allulose to the bean liquid before or during adding the coagulant.

In another embodiment, the bean liquid of the present application may be prepared by grinding beans; heating the ground beans; and separating pureed beans from the heated beans. Specifically, for the heating the ground beans, the beans may be heated at a temperature of 90° C. to 110° C., 95° C. to 110° C., or 95° C. to 105° C.

In still another embodiment, the method for manufacturing tofu of the present application may further include forming after adding the coagulant to bean liquid. Specifically, the forming of the present application may be performed at a temperature of 70° C. to 90° C., 75° C. to 90° C., or 80° C. to 90° C. Further, the forming of the present application may be performed for 40 minutes to 80 minutes, 40 minutes to 70 minutes, 50 minutes to 80 minutes, or 50 minutes to 70 minutes.

In yet another embodiment, the method for manufacturing tofu of the present application may further include sterilizing after adding the coagulant to bean liquid.

In yet still another embodiment, the method for manufacturing tofu of the present application may further include cooling after forming of the present application or sterilizing of the present application. Specifically, the cooling may be performed at a temperature of 15° C. or lower, 0° C. to 15° C., 3° C. to 15° C., or 3° C. to 10° C.

According to still another of the present application, the present application provides a method for decreasing hardness of tofu comprising: adding a coagulant to bean liquid; and adding allulose to the bean liquid before or during adding the coagulant.

According to yet another of the present application, the present application provides a method for decreasing bubble of tofu comprising: (a) adding a coagulant to bean liquid; and (b) adding allulose to the bean liquid before or during adding the coagulant.

The method for decreasing hardness of tofu or the method for decreasing bubble of tofu may utilize the descriptions, intactly, with regard to tofu or the method for manufacturing tofu of the present application, so that the common descriptions between them are omitted in order to avoid undue redundancy leading to the complexity of this specification.

Advantageous Effects

The present application provides an advantage in that a tofu product having soft texture and smooth surface can be obtained by adding allulose, during manufacturing of tofu, thereby minimizing formation of bubbles generated during the process of manufacturing tofu, and reducing hardness, springiness, cohesiveness, gumminess, and chewiness.

MODE FOR CARRYING OUT THE INVENTION

Hereinafter, the present application will be described in more detail with reference to the specific examples. However, the present application is not limited to the following examples, and since those skilled in the art or similar art can fully recognize and infer the descriptions not described herein, detailed description will be omitted.

EXAMPLE 1

Preparation of Uncurdled Bean Curd

Blending ratio of raw materials for the preparation of uncurdled bean curd is shown in Table 1 by weight percent.

The preparation of uncurdled bean curd including allulose (72 Brix, allulose of 98 wt % or more, CJ CheilJedang, Inc.) (Experimental Example 1) was performed as the following. Yellow soybeans were fully washed, macerated in water, and then finely ground by a grinder with adding water little by little. Thereafter, strong smell of beans was removed by heating to a temperature of 100° C., and proteins were eluted. After heating, the resultant was filtered with a cotton cloth, and was thus separated into bean liquid and pureed bean. After cooling the bean liquid, allulose was added thereto and mixed, and then magnesium chloride was added as a coagulant. Afterwards, the resultant bean liquid was packaged in a container, heated at 85° C. for 60 minutes, and thereby uncurdled bean curd was formed and sterilized. The resulting uncurdled bean curd was cooled at 15° C. or lower, and then stored under refrigeration at 4° C.

Comparative Example 1 was prepared in the same manner as in Experimental Example 1, except that only a step of adding allulose is skipped in the preparation method of Experimental Example 1.

TABLE 1

| Classification | Experimental Example 1 | Comparative Example 1 |
|---|---|---|
| Bean liquid | 94.74 | 99.74 |
| Coagulant | 0.26 | 0.26 |
| Allulose | 5 | 0 |
| Total | 100 | 100 |

EXAMPLE 2

Functional Evaluation

The appearance of the uncurdled bean curd prepared in the Example 1 was observed, and a functional evaluation was carried out. The functional evaluation was carried out in such a way that 9 trained panels tasted each tofu product in a cold state without heating, their mouths were washed with water every finishing evaluation of a sample, and after 1 minute they were allowed to evaluate the next sample. General taste preference, appearance preference, and sweetness preference were evaluated, and the results were shown based on five-point scale (Table 2).

[Evaluation Criteria]

Five-point preference (5: Very good, 4: Somewhat good, 3: Fair, 2: Poor, 1: Very poor)

Figure 1:
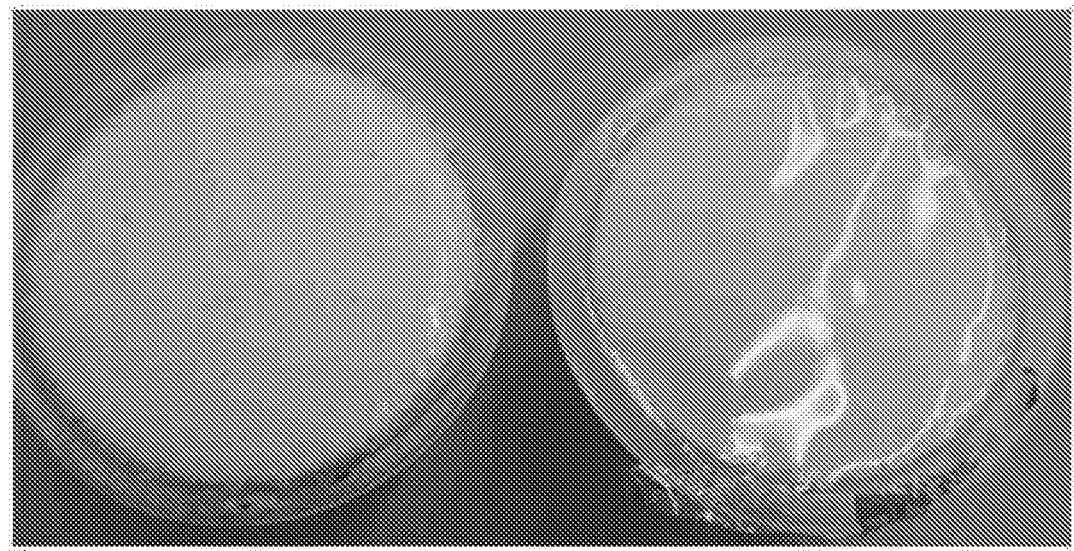
FIG. 1 is a real picture of tofu for confirming the appearance of tofu (whether bubbles regenerated) according to the present application, in which the left is a picture of tofu according to comparative example 1, and the right is a picture of tofu according to experimental example 1.

As a result, on the surface, since addition of the allulose resulted in a decrease in bubble formation to make the tofu product have a smooth surface (the right picture of FIG. 1), it was confirmed that the appearance preference was high (Table 2), and it was evaluated that the addition of the allulose did not have an influence on the general taste preference and the sweetness preference (Table 2).

TABLE 2

| Classification | Experimental Example 1 | Comparative Example 1 | P-value |
|---|---|---|---|
| General taste Preference | 3.44 | 3.44 | 0.50 |
| Appearance Preference | 4.56 | 3.67 | 0.03 |
| Sweetness Preference | 3.00 | 3.11 | 0.38 |

EXAMPLE 3

Physical Analysis of Uncurdled Bean Curd

Physical properties of tofu were confirmed depending on whether allulose was added and the concentration of allulose added in the preparation of uncurdled bean curd. The uncurdled bean curd was prepared using the preparation method of Experimental Example 1, an amount of allulose was adjusted to 0 wt %, 5 wt % (3.5 wt % based on dry solids), 10 wt % (7.1 wt % based on dry solids), 15 wt % (10.6 wt % based on dry solids), and 20 wt % (14.1 wt % based on dry solids) and then the allulose was added, and a content of the bean liquid was adjusted to be small as the added amount of allulose in order to adjust the total weight equally.

The physical properties were confirmed by measuring hardness, springiness, cohesiveness, gumminess, and chewiness using TA-XT Plus (Texture Technologies, UK) that is a physical property analyzer, and an average value measured total five times under the same condition was used as a result.

The physical property analyzer mimics an action of bite twice in human mouth. A probe (cylinder metal probe) of the physical property analyzer goes down to a food sample from an adjusted distance at an adjusted speed. Then, the probe goes up to a pre-adjusted distance and goes down again for a second bite. A force-sensing device and a converter recognize force applied the sample for measurement and send the data (force value, operation time, probe distance) to a computer. Definition of terms and conditions for measuring physical properties are as the following:

<Definition of Terms for Measuring Physical Properties>

Figure 2:
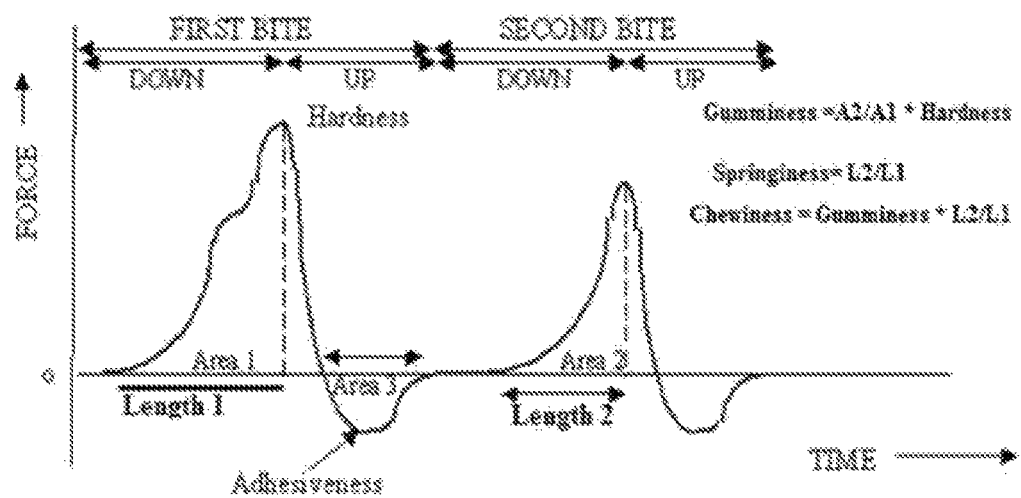
FIG. 2 shows a physical property profile curve showing physical property measurement terms of tofu according to the present application.

(1) Hardness (g): a force which is necessary to reach a determined deformation, and is the maximum force of a first bite (the highest peak of a first compression in FIG. 2)

(2) Springiness: a speed at which a deformed material returns to the original state after removal of a transforming force (Length 2/Length 1=L2/L1 in FIG. 2)

(3) Cohesiveness: an internal bonding level necessary to make the food body (Area 2/Area 1=A2/A1 in FIG. 2)

(4) Gumminess (g): a force necessary to decompose a semi-solid food (a property to make a semi-solid sample swallowable) (=cohesiveness*hardness)

(5) Chewiness (g): numbers of steps of bite necessary to swallow a food (=gumminess*springiness)

<Conditions for Measuring Physical Properties>

Probe: a cylindrical shape having a diameter of 2 cm;

Speed (pre-test speed) at which the probe goes down to a sample: 5.00 mm/sec;

Speed (test speed) at which the probe penetrates the sample after touching the surface of the sample: 5.00 mm/sec;

Speed (post-test speed) at which the probe returns to the original position after penetrating through the sample: 5.00 mm/sec;

Target mode of the probe: distance;

Distance by which the probe recognizes the surface of the sample and penetrates the sample: 5.000 mm;

Condition (trigger type) under which the probe recognizes the sample: force; and Force (trigger force) under which the probe recognizes the presence of the sample: condition for setting to 10.0 g.

Physical properties of tofu according to whether to add the allulose was confirmed, and as a result, tofu prepared by adding the allulose had a decrease of hardness (force hardness), springiness, cohesiveness, gumminess, and chewiness (energy chewiness), and thus had improved soft texture in comparison with tofu without the allulose added thereto. Analysis of physical properties of tofu according to the concentration of the added allulose demonstrates that when the concentration of the added allulose increased, springiness and cohesiveness were maintained to equally form tofu, but hardness decreased to thereby allow tofu to have softer texture (Table 3).

TABLE 3

| Allulose content (wt %) | Tofu solids content (Dry solids wt %) | Hardness (g) | Springiness | Cohesiveness | Gumminess (g) | Chewiness (g) |
|---|---|---|---|---|---|---|
| 0 | 10.25 | 176.36 | 2.04 | 0.79 | 140.66 | 302.59 |
| 5 | 12.66 | 130.78 | 1.02 | 0.68 | 89.61 | 91.82 |
| 10 | 15.77 | 123.29 | 1.09 | 0.73 | 89.36 | 97.69 |
| 15 | 18.33 | 122.40 | 1.21 | 0.73 | 89.76 | 107.99 |
| 20 | 20.15 | 101.76 | 1.12 | 0.71 | 72.32 | 81.76 |

From the above description, those of ordinary skill in the art of the present application will be understood that the present application can be carried out in other specific forms without changing the technical idea or essential features. Therefore, the above-disclosed embodiments are to be understood in all aspects as illustrative and not restrictive. Accordingly, the scope of the present application is defined by the following claims rather than by the detailed description. It shall be understood that all modifications or changes in forms conceived from the meaning and scope of the claims and their equivalents are included in the scope of the present application.

The invention claimed is:

1. Tofu comprising beans, allulose, and a coagulant, wherein the allulose is contained such that a dry solid content thereof is in a range of 3 wt % to 20 wt %, based on the total weight of the tofu,
wherein the coagulant is contained in an amount of 0.1 wt % to 1.0 wt %, based on the total weight of the tofu,
wherein the tofu has a dry solid content of 11.5 wt % to 25 wt %,
wherein the tofu has a hardness of 80 g to 150 g.

2. The tofu of claim 1, wherein the tofu has a springiness of 0.8 to 1.5.

3. The tofu of claim 1, wherein the tofu has a gumminess of 50 g to 100 g.

4. The tofu of claim 1, wherein the tofu has a cohesiveness of 0.6 to 0.75.

5. The tofu of claim 1, wherein the tofu has a chewiness of 50 g to 200 g.

6. The tofu of claim 1, wherein the allulose is contained such that a dry solid content thereof is in a range of 0.1 to 40 parts by weight, based on 100 parts by weight of the bean.

7. The tofu of claim 1, wherein the coagulant is magnesium chloride.

8. A method for manufacturing tofu, the method comprising:
adding a coagulant to bean liquid;
decreasing bubble of tofu by adding allulose to the bean liquid before adding the coagulant or during adding the coagulant; and
forming bean curd after adding the coagulant to the bean liquid, at a temperature of 70° C. to 90° C. for 40 minutes to 80 minutes;
wherein the allulose is contained such that a dry solid content thereof is in a range of 3 wt % to 20 wt %, based on the total weight of the tofu,
wherein the coagulant is contained in an amount of 0.1 wt % to 1.0 wt %, based on the total weight of the tofu,
wherein the tofu has a dry solid content of 11.5 wt % to 25 wt %, wherein the tofu has a hardness of 80 g to 150 g.

* * * * *